(12) United States Patent
Krig et al.

(10) Patent No.: US 10,497,140 B2
(45) Date of Patent: Dec. 3, 2019

(54) HYBRID DEPTH SENSING PIPELINE

(71) Applicant: Intel Corporation, Santa Clara, CA (US)

(72) Inventors: Scott Krig, Folsom, CA (US); Gregory Johnson, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1018 days.

(21) Appl. No.: 13/968,076

(22) Filed: Aug. 15, 2013

(65) Prior Publication Data

US 2015/0049169 A1 Feb. 19, 2015

(51) Int. Cl.
*G06T 7/593* (2017.01)
*G06K 9/00* (2006.01)
*H04N 13/211* (2018.01)
*H04N 13/00* (2018.01)

(52) U.S. Cl.
CPC .......... *G06T 7/593* (2017.01); *G06K 9/00201* (2013.01); *G06K 9/00268* (2013.01); *H04N 13/211* (2018.05); *G06T 2207/10021* (2013.01); *G06T 2207/20016* (2013.01); *H04N 2013/0081* (2013.01); *H04N 2213/005* (2013.01)

(58) Field of Classification Search
CPC ......... G06T 7/0075; G06T 2207/10021; G06T 2207/20016; H04N 13/021; H04N 2213/005; H04N 2013/0081
See application file for complete search history.

(56) References Cited

U.S. PATENT DOCUMENTS

| 6,009,359 | A | * | 12/1999 | El-Hakim | G01C 11/02 348/135 |
|---|---|---|---|---|---|
| 6,084,979 | A | * | 7/2000 | Kanade | H04N 13/0055 345/424 |
| 2008/0024596 | A1 | * | 1/2008 | Li | H04N 5/2257 348/47 |
| 2008/0205791 | A1 | * | 8/2008 | Ideses | H04N 13/026 382/285 |
| 2012/0039525 | A1 | * | 2/2012 | Tian | G06T 5/005 382/154 |
| 2012/0050482 | A1 | * | 3/2012 | Boross | H04N 13/0018 348/46 |
| 2012/0056982 | A1 | * | 3/2012 | Katz | H04N 13/025 348/43 |
| 2012/0075432 | A1 | * | 3/2012 | Bilbrey | G01J 4/00 348/48 |
| 2012/0249746 | A1 | * | 10/2012 | Cornog | H04N 13/0022 348/47 |
| 2013/0250053 | A1 | * | 9/2013 | Levy | H04N 13/0207 348/43 |
| 2013/0304831 | A1 | * | 11/2013 | Volach | H04L 67/24 709/206 |

(Continued)

*Primary Examiner* — Jefferey F Harold
*Assistant Examiner* — Sean N. Haiem
(74) *Attorney, Agent, or Firm* — International IP Law Group, P.L.L.C.

(57) ABSTRACT

An apparatus for a hybrid tracking and mapping is described herein. The apparatus includes logic to determine a plurality of depth sensing techniques. The apparatus also includes logic to vary the plurality of depth sensing techniques based on a camera configuration. Additionally, the apparatus includes logic to generate a hybrid tracking and mapping pipeline based on the depth sensing techniques and the camera configuration.

7 Claims, 9 Drawing Sheets

(56) References Cited

U.S. PATENT DOCUMENTS

| | | | |
|---|---|---|---|
| 2013/0329012 A1* | 12/2013 | Bartos | H04N 13/0246 348/46 |
| 2014/0063229 A1* | 3/2014 | Olsson | H04N 5/2252 348/84 |
| 2014/0267616 A1 | 9/2014 | Krig | |
| 2016/0098863 A1* | 4/2016 | Liu | G06T 11/60 345/633 |

* cited by examiner

400

HYBRID DEPTH SENSING PIPELINE

TECHNICAL FIELD

The present invention relates generally to depth sensing. More specifically, the present invention relates to a hybrid depth sensing pipeline for tunable accuracy, performance, resolution and power.

BACKGROUND ART

By determining the depth within images, the position and orientation of a camera within a physical space may be estimated, thereby tracking the camera pose. The camera pose may describe the camera viewpoint direction and orientation. Additionally, the coordinates of points in the space of the image may be estimated such that the points within the image are mapped. Mapping an image may include reconstructing the depth of features in the space seen by the camera.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
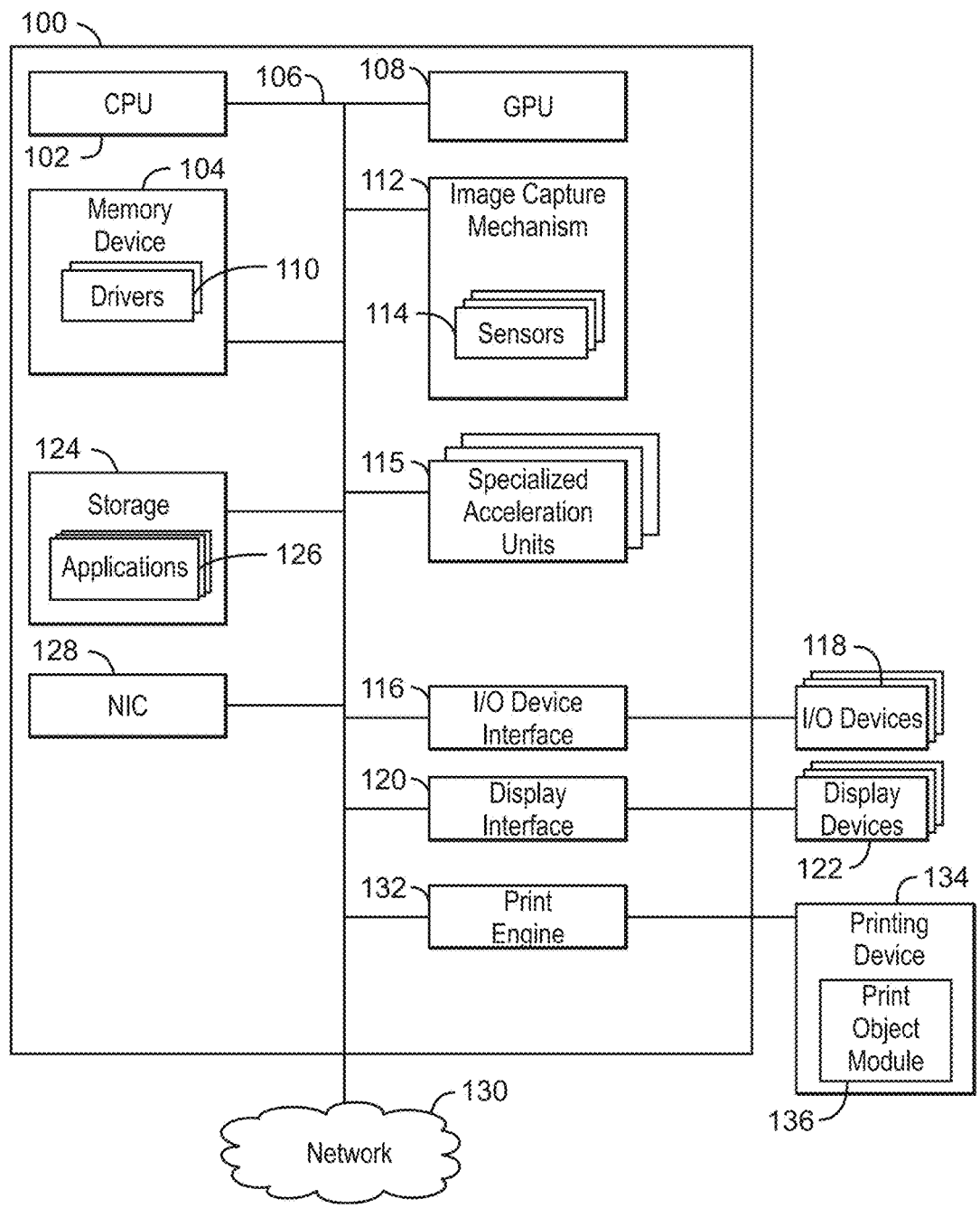
FIG. 1 is a block diagram of a computing device that may be used to enable HTAM.

Determining the depth of features within images may be accomplished using various techniques such as disparity estimation from stereoscopic image left/right pairs, multi-view stereoscopic (MVS) reconstruction from image sequences, and structured light scanning. It is also possible to measure depth directly using satellites to collect swathes of images and then determining the disparity between the images. Other depth sensing techniques include radio wave imaging (RADAR), laser range imaging (LIDAR), time-of-flight (TOF) sensors using infrared light range imaging, structured light patterns and sensors, and many other techniques.

Once captured, the depth information may be sent to a processing unit for further processing along with the associated image texture information. Accordingly, the depth information may be sent to the processing unit in any of a variety of formats based upon the techniques used to capture the depth information. However, current depth sensing techniques are used in isolation. Moreover, depth sensing techniques are not combined. The lack of combined depth sensing techniques into a standard pipeline overlooks accuracy and performance that could be gained by combining various depth sensing techniques. Additional combined depth sensing techniques may enable adjustments and tuning of the standard pipeline based on power, performance, resolution and accuracy considerations that may change in real time. Accordingly, embodiments described herein enable Hybrid Tracking and Mapping (HTAM) as a standard pipeline the enables adjustments and tuning in real time to modify power, performance, resolution and accuracy of the depth sensing system. This hybrid depth sensing technique may be implemented by generating a programmable pipeline to achieve performance and accuracy which can be tuned to the capabilities of various devices. Particularly, the depth sensing techniques may be used to take advantage of the hardware and software available on a computing system. For example, a depth map may be produced from a single camera or a stereo camera and share portions of the same pipeline. For ease of description, the techniques are described using pixels. However, any unit of image data can be used, such as a voxel, point cloud, or 3D mesh as used in computer graphics.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 that may be used to enable HTAM. The computing device 100 may be, for example, a laptop computer, desktop computer, tablet computer, mobile device, or server, among others. The computing device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the computing device 100 may include more than one CPU 102. The instructions that are executed by the CPU 102 may be used to implement shared virtual memory.

The computing device 100 may also include a graphics processing unit (GPU) 108. As shown, the CPU 102 may be coupled through the bus 106 to the GPU 108. The GPU 108 may be configured to perform any number of graphics operations within the computing device 100. For example, the GPU 108 may be configured to render or manipulate graphics images, graphics frames, videos, or the like, to be displayed to a user of the computing device 100. In some embodiments, the GPU 108 includes a number of graphics engines (not shown), wherein each graphics engine is configured to perform specific graphics tasks, or to execute specific types of workloads. For example, the GPU 108 may include an engine that produces variable resolution depth maps. The particular resolution of the depth map may be based on an application.

The memory device 104 can include random access memory (RAM), read only memory (ROM), flash memory, or any other suitable memory systems. For example, the memory device 104 may include dynamic random access memory (DRAM). The memory device 104 includes drivers 110. The drivers 110 are configured to execute the instructions for the operation of various components within the computing device 100. The device driver 110 may be software, an application program, application code, or the like.

The computing device 100 includes an image capture device 112. In some embodiments, the image capture device 112 is a camera, monocular camera, stereoscopic camera, infrared sensor, or the like. The image capture device 112 is used to capture image information. The image capture mechanism may include sensors 114, such as a depth sensor, an image sensor, an infrared sensor, an X-Ray photon counting sensor or any combination thereof. The image sensors may include charge-coupled device (CCD) image sensors, complementary metal-oxide-semiconductor (CMOS) image sensors, system on chip (SOC) image sensors, image sensors with photosensitive thin film transistors, or any combination thereof. In some embodiments, a sensor 114 is a depth sensor 114. The depth sensor 114 may be used to capture the depth information associated with image information. In some embodiments, a driver 110 may be used to operate a sensor within the image capture device 112, such as the depth sensor 114. The depth sensor 114 may capture depth information by altering the position of the sensor such that the images and associated depth information captured by the sensor is offset due to the motion of the camera. In a single depth sensor implementation, the images may also be offset by a period of time. Additionally, in examples, the sensors 114 may be a plurality of sensors. Each of the plurality of sensors may be used to capture images that are spatially offset at the same point in time. The computing device 100 may also include specialized acceleration units 115. The specialized acceleration units 115 are compute units that execute a fixed set of instructions specialized to a task. In embodiments, the specialized acceleration units 115 are compute units that are specialized for image processing tasks.

The CPU 102 may be connected through the bus 106 to an input/output (I/O) device interface 116 configured to connect the computing device 100 to one or more I/O devices 118. The I/O devices 118 may include, for example, a keyboard and a pointing device, wherein the pointing device may include a touchpad or a touchscreen, among others. The I/O devices 118 may be built-in components of the computing device 100, or may be devices that are externally connected to the computing device 100.

The CPU 102 may also be linked through the bus 106 to a display interface 120 configured to connect the computing device 100 to a display device 122. The display device 122 may include a display screen that is a built-in component of the computing device 100. The display device 122 may also include a computer monitor, television, or projector, among others, that is externally connected to the computing device 100.

The computing device also includes a storage device 124. The storage device 124 is a physical memory such as a hard drive, an optical drive, a thumbdrive, an array of drives, or any combinations thereof. The storage device 124 may also include remote storage drives. The storage device 124 includes any number of applications 126 that are configured to run on the computing device 100. In examples, an application 126 may be used to generate an HTAM pipeline.

The computing device 100 may also include a network interface controller (NIC) 128 configured to connect the computing device 100 through the bus 106 to a network 130. The network 130 may be a wide area network (WAN), local area network (LAN), or the Internet, among others.

In some embodiments, a printer may use HTAM features to provide variable resolution depth information. For example, a three dimensional (3D) printer can provide variable resolution depth information suited to a particular 3D printing device or object being printed on the device. HTAM may be used to lower the resolution in areas of the printed object that are occluded, or areas where the printed object is cropped or clipped. Further, HTAM may be used to vary the resolution where the printed object resolution should be higher or lower than the resolution input to the pipeline. In some examples, the resolution may be higher or lower at the corners of the image. Additionally, in some examples, the resolution may be adjusted along a straight line or planar segment of the print object.

Accordingly, data may be sent to a print engine 132 for processing using HTAM as described above. The print engine 132 can send the resulting image to a printing device 134. The printing device 134 can include printers, fax machines, and other printing devices that can print the resulting image using a print object module 136. In embodiments, the print engine 132 may send data to the printing device 134 across the network 130.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

The system 100 may be used to enable Hybrid Tracking and Mapping (HTAM). Through HTAM, depth sensing techniques are combined into a programmable pipeline. Each depth sensing technique may be optimized and tuned for accuracy, power, performance, and resolution. In example embodiments, HTAM supports stereoscopic reconstruction. In stereoscopic imaging, two image sensors are present. The two sensors may be, for example, visible red green blue (RGB) spectrum sensors or infrared (IR) spectrum sensors, which may also include visible illumination or IR illumination.

Additionally, HTAM supports virtual stereoscopic reconstruction, where only a single image sensor is present. Virtual stereoscopic reconstruction enables stereoscopic processing, based on a system using a combination of software only or fixed function hardware presently available in numerous devices to be deployed for both dual camera and single camera configurations. In some cases, virtual stereoscopic reconstruction uses sequential frames from a single camera. The sequential frames are rectified, aligned, and cropped to prepare for standard stereoscopic processing. The standard stereoscopic processing may be embodied in a combination of hardware or software processing units, thereby enabling stereoscopic systems to be re-used in cases where a single camera is present. Moreover, rectifying and aligning sequential image frames enables the frames to be fed into stereo depth extraction pipelines as if the sequential image frames were stereoscopic frames obtained from multiple sensors.

Various suitable methods may be employed to rectify images under virtual stereoscopic reconstruction, using a combination of methods such as image correlation, pattern recognition, image scaling, image warping, image translation and image warping to effectively render two sequential images to appear as though they are from a stereo camera. The HTAM techniques discussed herein fully supports these methods and does not depend on any particular method in order to implement virtual stereo.

HTAM may also enable multi-view stereoscopic (MVS) reconstruction as an accuracy enhancing stage for both stereoscopic reconstruction and virtual stereoscopic reconstruction. The accuracy enhancing stage can also use voxel integration, point cloud, or single depth map methods. In voxel integration, a series of depth maps may be fused and integrated together to create a surface. In the point cloud methods, the depth information may be combined together into a common point cloud. In the single depth map method, holes in the depth map may be progressively filled in as more and more frames are integrated together. Additionally, other depth sensing methods may be enabled by HTAM, such as volume imaging from array cameras or plenoptic systems, as well as other sources of range information such as LIDAR, RADAR, TOF. Additionally, HTAM supports motion detection to guide depth-algorithm-selection, such as using an accelerometer to determine which algorithm to select during motion and which algorithm to select during no motion, partial motion, etc. As a result, the HTAM pipeline used while motion is sensed may be different than the pipeline used when no motion occurs. In example embodiments, motion can be determined by comparing sequential frames as an alternative to accelerometers and used for algorithm selection. For ease of description, particular depth sensing methods have been specified. However, HTAM may support any depth sensing technique presently used or developed in the future.

Figure 2A:
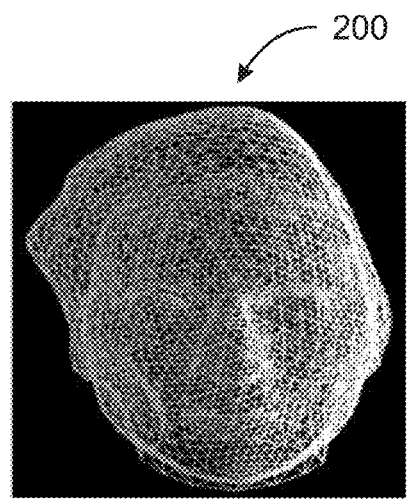
FIG. 2A is a polygonal mesh.

FIG. 2A is a polygonal mesh 200. The polygonal mesh 200 includes vertices, lines, edges, and faces that are used to define the shape of a 3D object. For ease of description, the techniques described herein are described using a triangular mesh. However, any type of mesh may be used in accordance with the present techniques. For example, the mesh 200 may be a quadrilateral mesh or triangular mesh. When depth information is collected, it is stored as one or more depth representations, including depth maps (a 2D array of depth information), point clouds of XYZ feature coordinates, or 3D mesh format. Accordingly, a plurality of depth formats may be combined in order to generate a depth representation, such as a 3D mesh. The mesh is composed of points within a 3D space, and the depth information may also be considered a 3D point cloud. Furthermore, the mesh may be encoded as a depth map in a 2D array where the array values indicate the depth of each point. Corresponding information such as color, normal vectors and texture coordinates may be applied to the depth representation. In examples, the texture coordinates may be used to link the mesh 200 to texture information, such as a texture map. The texture information adds details, colors, or image texture information to the triangular mesh 200.

Figure 2B:
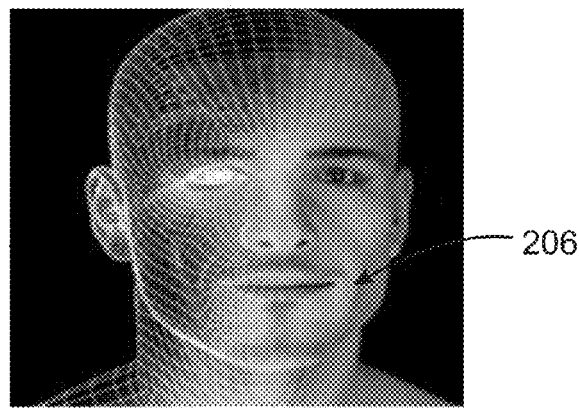
FIG. 2B is a polygonal mesh with textures applied.

FIG. 2B is a polygonal mesh with textures applied. The triangular mesh 200 shows the form of a human face when the textures 206 have been applied to an illustrative triangular mesh similar to the triangular mesh shown in FIG. 200. Rendering an image using polygonal meshes and corresponding textures may be accomplished using a graphics pipeline in conjunction with a standard graphics or media encoding format such as OpenGL, DirectX, H.264, MPEG-4, and VC-1.

The HTAM programmable pipeline to produce a depth representation may be implemented on multiple mobile platform camera configurations. HTAM provides a common pipeline framework and architecture for depth sensing techniques to work together. This framework enables phone and tablet manufacturers to choose a camera configuration to fit the cost, form factor, and power budget specific to a given device, and achieve depth sensing performance and accuracy tuned for that device. As discussed above, the HTAM pipeline is a variable pipeline. HTAM enables various depth sensing algorithms to be combined together into pipelines as needed. For example, a system with a stereoscopic camera may use HTAM to calculate stereoscopic images while the camera is stopped, virtual stereoscopic images while the system is moving, and then use MVS reconstruction to improve the depth representation.

Moreover, HTAM enables tunable accuracy. HTAM provides a bundle adjustment stage to minimize depth representation errors. For example, a depth representation error may be point cloud XYZ positional errors. Bundles of past frames or past point clouds may be kept in a history buffer and used to improve the depth map. The depth sensing techniques can be followed by a bundle adjustment to improve accuracy, limited to any frames in the history buffer, and the size of the history buffer can be tuned as well.

Figure 2C:
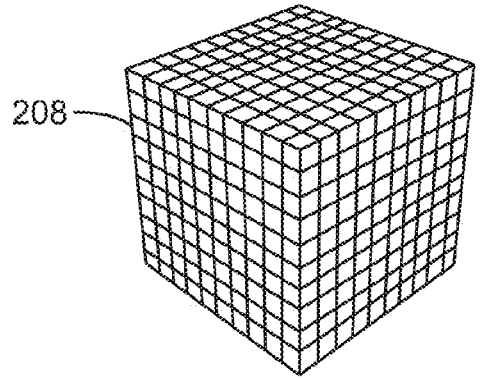
FIG. 2C is an exemplary set of voxels.
Figure 2C:
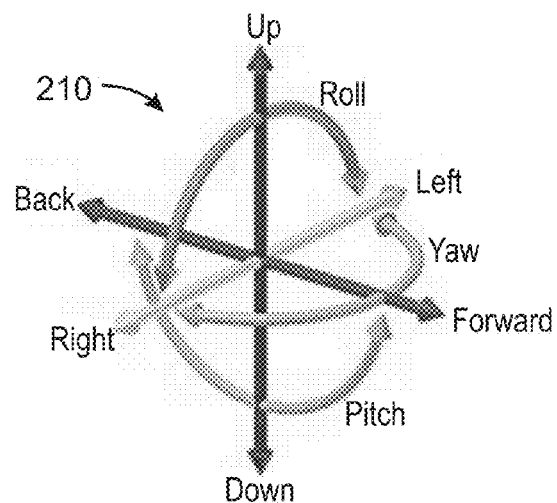

FIG. 2C is an exemplary set of voxels 208. In embodiments, the bundle adjustment stage can be considered a history stage that contains a copy of previous sequential depth frames. This history stage may also include a volume representation of 3D space to integrate depth information as voxels 208 as shown in FIG. 2C. The newest depth information may then be integrated together with past depth information into a common volume representation that enables averaging of depth information to reduce noise and increase accuracy. The integration of the newest depth information also enables depth information from multiple viewpoints to be integrated together over time. HTAM may also enable a surface fusion stage to integrate depth maps into a voxel volume as a final processing step. HTAM may also enable a camera pose module to determine the orientation of the camera in space from frame to frame, showing where the camera is pointed, where the camera pose is oriented into 6 degrees of freedom in X left-right, Y up-down, Z back-front, roll, pitch and yaw as shown at reference number 210 in FIG. 2C.

HTAM provides for a tunable history buffer which keeps a copy of the most recent N frames in memory for point cloud refinement. For example, the history buffer may contain a chosen number of images, say 100 past images, where each image is saved as an image pyramid for future analysis, and bundles of images in the history buffer can be analyzed together in groups to compute refinements to the point cloud data. Thus, using the history buffer is a tunable stage after stereoscopic, virtual stereoscopic, or MVS stereoscopic calculations are performed.

Figure 3:
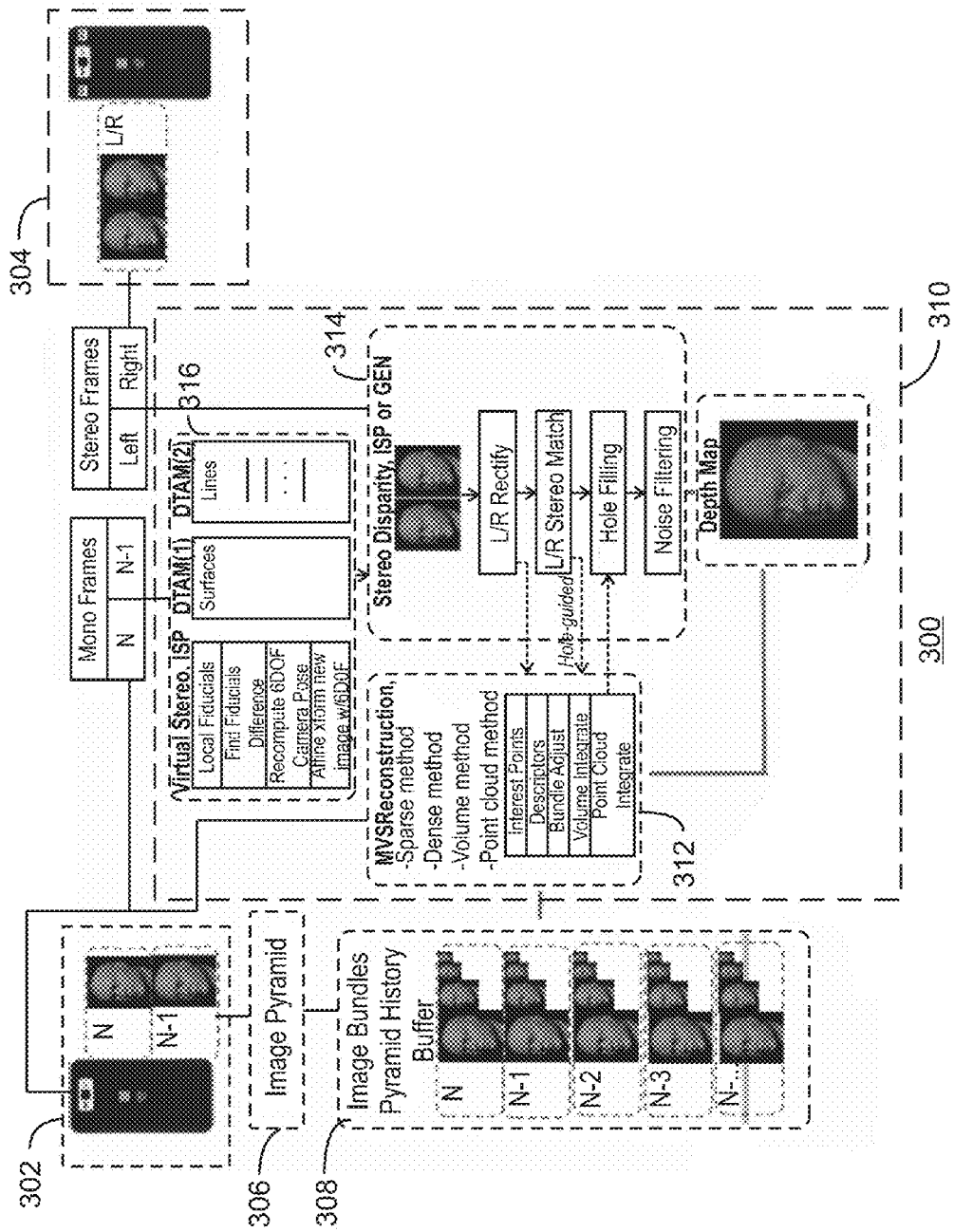
FIG. 3 is an exemplary HTAM pipeline.

FIG. 3 is an exemplary HTAM pipeline. In this exemplary pipeline, stereoscopic, virtual stereoscopic and multi-view stereoscopic reconstruction techniques are described. The depth information obtained from the HTAM pipeline enables the position of the camera to be tracked and also produces a depth representation of an image, such as a depth map or point cloud. The pipeline may be configured based on the hardware and software features of the image capture device. HTAM may employ a set of depth vision engines, where the depth vision engines support standard visual depth range techniques including stereoscopic, virtual stereoscopic, and MVS. The depth vision engines may be implemented using hardware, fixed function hardware, software, or any combination thereof.

Camera 302 is an image capture device, such as a monocular camera, that captures a single image at a time. Thus, the images are sequential frames, such a frame N, frame N−1, and so on. In some cases, N is a point in time. Accordingly, each frame is captured at an offset of time. The camera 302 can be moved in the field of view between each frame capture by physically moving the entire camera or by repositioning the sensor within the camera. Depth information may be obtained creating virtual stereoscopic frames at block 316. To create virtual stereoscopic frames using sequential frames from a monocular camera, frame N and frame N−1 are analyzed using the motion that occurred between the two frames to form a stereoscopic frame pair.

Specifically, the virtual stereoscopic block 316 may compute virtual stereoscopic frames using frame N and frame N−1 by performing a left/right rectify, where the lines in the image are aligned and rectified as in a stereo image pair. In this manner, lines of the frame N and frame N−1 are aligned to function as a stereo pair, even though the images come from a single camera. In some cases, the images may be aligned using fixed function hardware. In an embodiment, the alignment may be performed as shown at block 316.

Specifically, at block 316, a stereo pair is generated from a set of images taken from a single camera such as the camera 302. In an embodiment, the camera 302 may send two sequential image frames as input to block 316. Fiducial marks may be located in both frames. In some cases, fiducial marks are points in the frames used as a fixed basis for comparing those frames. In some examples, the fiducial marks are selected to be portions of the image located in known locations, such as the corners of each frame. The selected marks are recognized using normalized correlation or any other method such as a feature descriptor, scale-invariant feature transform (SIFT) features, speeded up robust features (SURF) features, or correlation templates. The difference between fiducial marks in each sequential frame is computed and used to rectify the images together into a stereo pair. The stereo pair is used to estimate the camera pose corresponding to each frame. In some cases, the camera pose is the position and orientation of the camera. In embodiments, the camera pose may be in any format now known or developed in the future. An affine transform is used to express the spatial relationship between two different camera poses. An affine transform, or image rectification, is used to align the current frame with a previous image frame to create a pair of images. The resulting pair of images will appear as a stereo pair of images, such that the final output is a pair of aligned image frames, also referred to as a virtual stereo image frame pair. The virtual left/right frames generated from frame N and frame N−1 may be sent to the stereoscopic disparity engine 314 in order to extract depth information from the virtual left/right frames.

In addition to generating a stereoscopic pair of images from a monocular set of frames, an image pyramid may be calculated at the image pyramid block 306 for each frame. The image pyramid includes a plurality of copies of each frame, where each copy is at a different resolution. The pyramid of each frame may be bundled into an image bundles pyramid history buffer at block 308. In some cases, these images may be stored in a raw format or a compressed format. The image bundles stored at block 308 can be used to minimize depth representation errors, by optimizing the stereoscopic disparity calculations performed on the frames at block 314.

The buffered images may then be used to compute a depth representation at block 310 based on the desired data obtained from the image capture device hardware and the application of the depth representation. In the case of a single lens image capture device, such as camera 302, a multi-view stereoscopic (MVS) reconstruction 312 may be performed on the buffered images. In this depth sensing technique, the buffered images are analyzed in pairs, such that the pairs of frames are analyzed as virtual stereoscopic pairs. The MVS reconstruction may be performed using a sparse method or a dense method. In sparse MVS reconstruction, matching features are identified in a pair of frames. In dense MVS reconstruction, each matching pixel is identified in a pair of frames. Additionally, interest points and descriptors may be determined in the image bundle. Further, the image bundle may be adjusted. The adjusted image bundles may then be used by a stereoscopic disparity engine 314 to optimize the virtual stereoscopic frames generated at block 316.

In embodiments, the bundle adjustment stage during the MVS reconstruction 312 may include a history buffer or accumulation buffer in a 3D volume or voxel representation as shown in FIG. 2C, where depth image frames are integrated together over time to remove noise from the depth information, fill holes where no depth was found, and increase accuracy of the depth information, and subsequently depth surface information may be extracted from the volume and rendered as a 2D image.

Accordingly, in the case of a single lens camera, the stereoscopic disparity engine 314 may use information from the MVS reconstruction block to optimize the generation of a depth representation and reduce depth representation errors. For example, a depth representation error may be point cloud XYZ positional errors. Bundles of past frames or past point clouds may be kept in a history buffer and used to improve the depth map. The depth sensing techniques can optionally be followed by a bundle adjustment to improve accuracy, limited to any frames in the history buffer, and the size of the history buffer can be tuned as well.

Specifically, the stereoscopic disparity engine 314 may rectify the left/right image pair and use data from the MVS reconstruction at block 312 to improve the left/right rectify. As discussed above, during the left/right rectify, the images are lined up so that the line of each image corresponds to the other image. The stereoscopic disparity engine 314 may also perform left/right stereoscopic matching. During stereoscopic matching, features that match each image are determined. The stereoscopic disparity engine 314 can use data from the MVS reconstruction at block 312 to fill in holes that may be present in the frames. Holes may occur in the depth representation when not enough information is received to calculate a depth coordinate for a particular feature or pixel. The stereoscopic disparity engine 314 results in a depth representation, such as the depth map 318. Through the use of the MVS reconstruction, the HTAM enables tunable accuracy.

In some cases, a standard stereoscopic engine may work as the first stage of a depth pipeline, and then an MVS engine may operate as the 2nd stage of the depth vision pipeline to fill in the holes left by the stereoscopic disparity engine. In this manner, the HTAM can improve on the stereoscopic disparity and calculate point clouds as well as depth maps. Accordingly, HTAM enables virtual stereoscopic frames using a dual-frame correlation and template matching for alignment into virtual stereoscopic left/right pairs. HTAM will work with fixed function stereoscopic engines, and will work with software stereoscopic engines or image signal processor (ISP) stereoscopic engines. HTAM enables a virtual stereoscopic retrofit stage to adapt to a monocular camera as the video source to a stereoscopic pipeline.

Camera 304 is an image capture device that captures two images using two lenses. In this manner, the camera produces a left/right frame pair, and virtual stereoscopic frames are not used. The left/right frame pair can be sent directly to the stereoscopic disparity engine 314. However, the left and right frame pair typically does not have MVS reconstruction data available. Accordingly, to fill holes in the left/right frame pair, neighboring pixels or features can be used to interpolate values within the holes. The result of processing by the stereoscopic disparity engine 314 is a depth representation, such as the depth map 318.

HTAM algorithm tuning or policy controls may be used to scale power, performance, resolution, and accuracy using variable depth map resolutions, variable frame rates, and multiple depth vision engines as discussed above. The HTAM pipeline may also be tuned according to algorithm variation sequences, variable depth resolution, variable frame rate, and variable shape of the depth region. In examples, algorithm variation sequences may include MVS reconstruction when the camera is moving, and stereoscopic reconstruction when the camera is stationary. Additionally, variable depth resolution with both high and low settings may be used, along with variable frame rates and variable shape of depth regions, with variable resolutions within regions.

Figure 4:
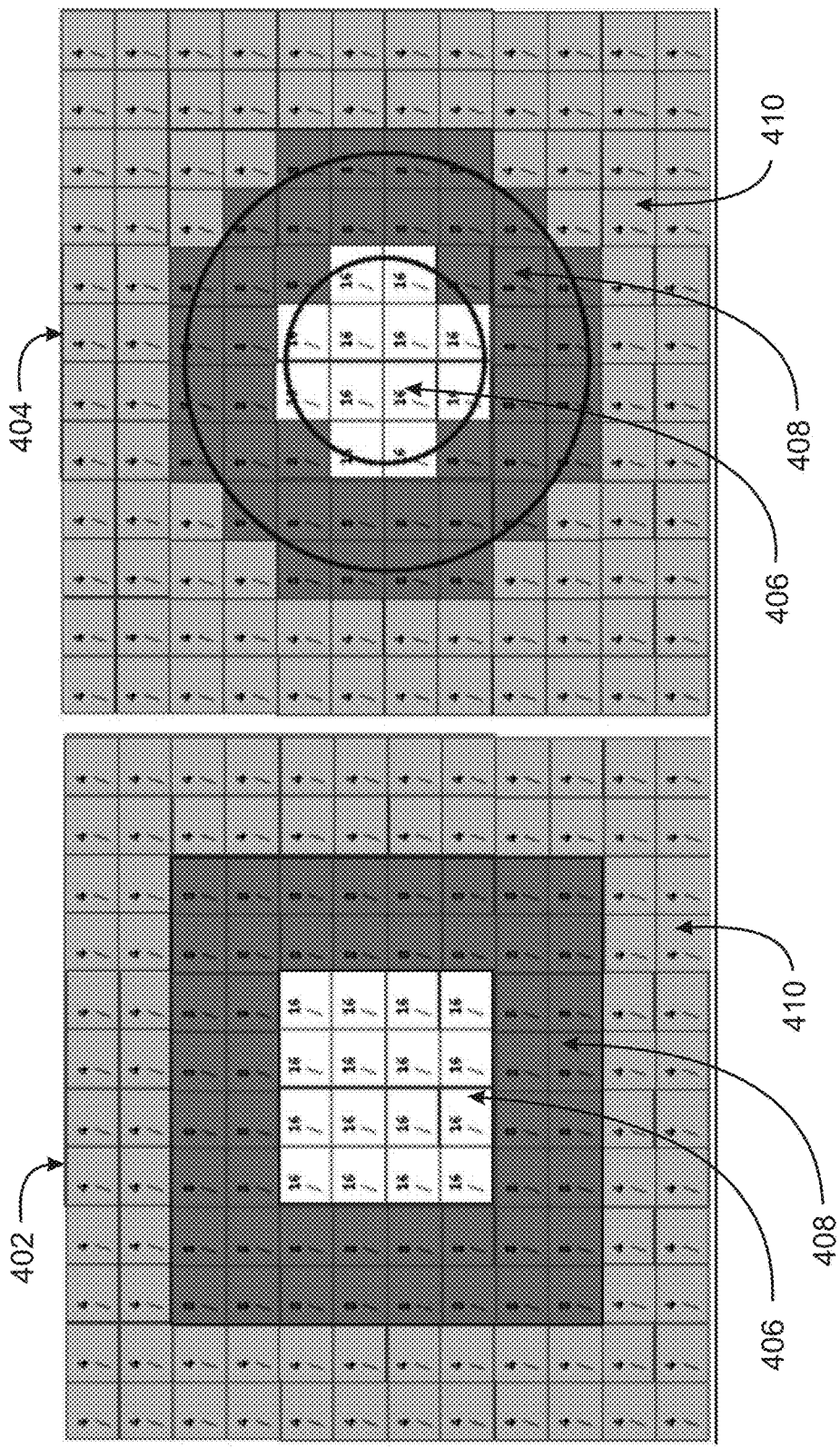
FIG. 4 is an illustration of a variable resolution depth map and another variable resolution depth map based on variable bit depths.

FIG. 4 is an illustration of a variable resolution depth map 402 and another variable resolution depth map 404 based on variable bit depths. The variable resolution depth map 402 and the variable resolution depth map 404 may be generated as a result of the HTAM pipeline as described above. Variable bit depths may also be referred to as variable bit precision. Both the variable resolution depth map 402 and the variable resolution depth map 404 have a specific bit depth, as indicated by the numerals inside each square of the depth map 402 and the depth map 404. For purposes of description, the depth map 402 and the depth map 404 are divided into a number of squares, with each square representing a pixel of the depth map. However, a depth map can contain any number of pixels.

The depth map 402 has regions that are square in shape, while the depth map 404 has regions that are substantially circular in shape. The regions of the depth map 404 are substantially circular, as the squares shown do not completely conform to a circular shape. Any shape can be used to define the various regions in the variable resolution depth representation such as circles, rectangles, octagons, polygons or curved spline shapes. The layer at reference number 406 in each of the depth map 402 and the depth map 404 has a bit depth of 16 bits, where 16 bits of information is stored for each pixel. By storing 16 bits of information for each pixel, a maximum of 65,536 different gradations in color can be stored for each pixel depending on the binary number representation. In an embodiment, any bit depth may be selected. The layer at reference number 408 of the depth map 402 and the depth map 404 has a bit depth of 8 bits, where 8 bits of information is stored for each pixel which results in a maximum of 456 different gradations in color for each pixel. Finally, the layer at reference number 410 has a bit depth of 4 bits, where 4 bits of information is stored for each pixel which results in a maximum of 16 different gradations in color for each pixel.

Figure 5:
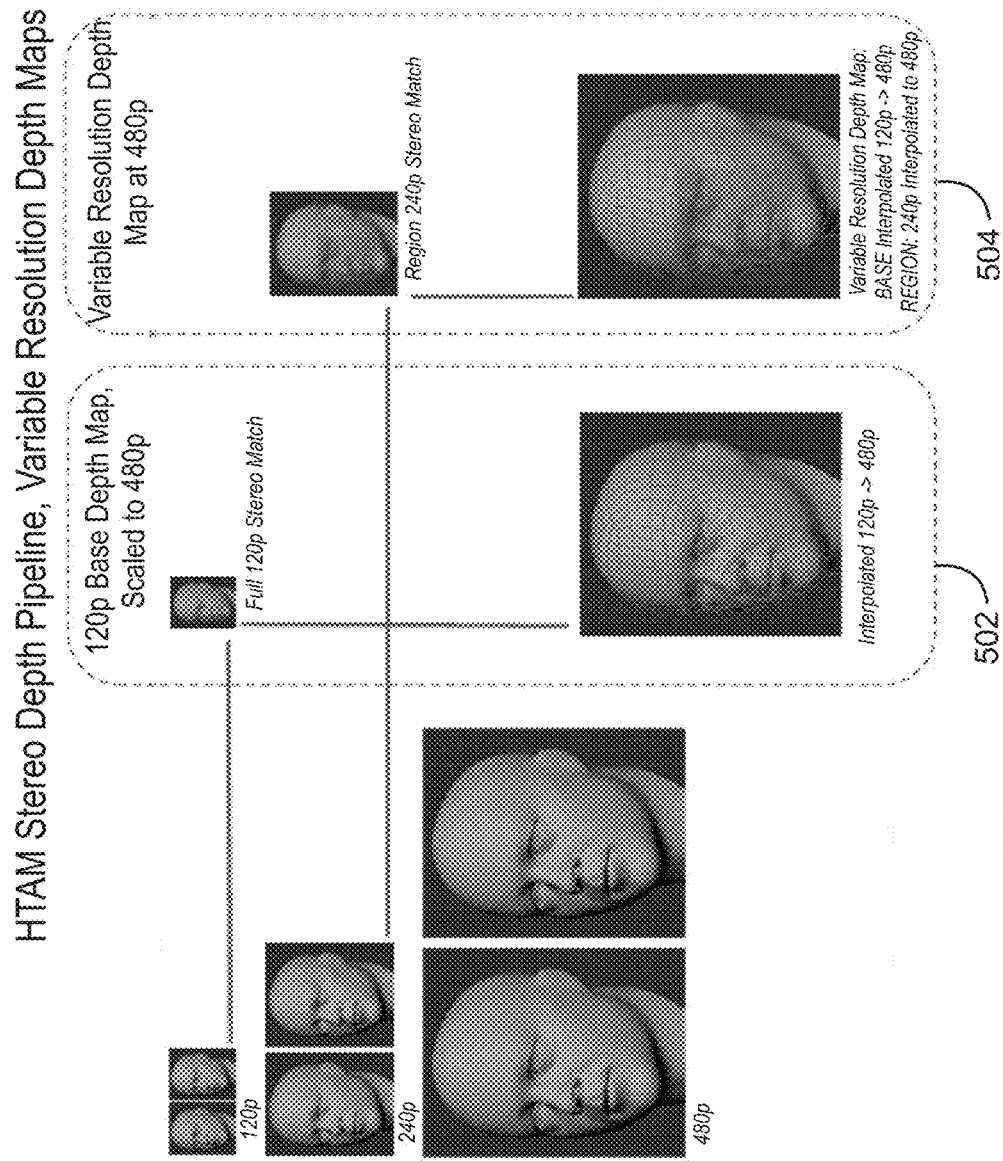
FIG. 5 is an HTAM stereoscopic depth pipeline with variable resolution depth maps.

FIG. 5 is an HTAM stereoscopic depth pipeline with variable resolution depth maps. In this example, the HTAM pipeline has been programmed to produce a variable resolution depth map as discussed above. At block 502, a base depth map is generated. The base depth map may be initially set at 120 pixels. The base depth map may then be interpolated to 480 pixels using a stereoscopic matching technique. At block 504, regions of a 240 pixels depth map may be used to interpolate the regions to a 480 pixels depth map.

Figure 6:
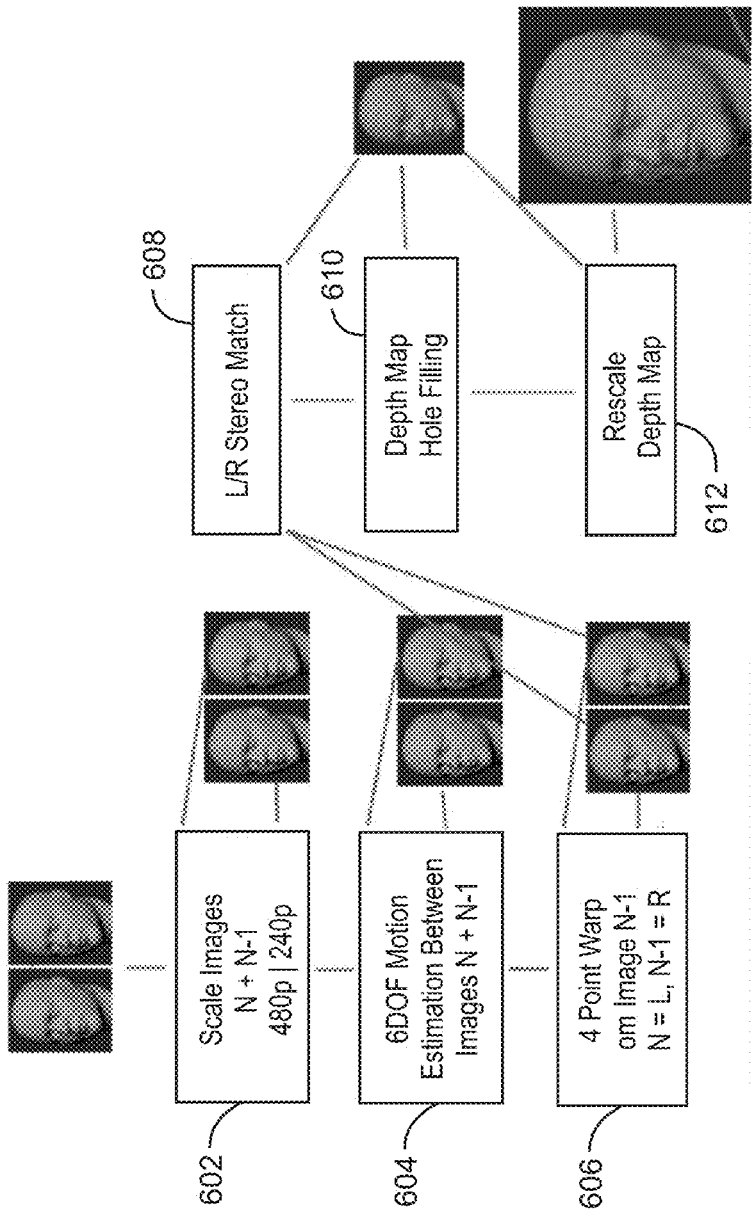
FIG. 6 is another exemplary stereoscopic depth pipeline that produces variable resolution depth maps.

FIG. 6 is another exemplary stereoscopic depth pipeline 600 that produces variable resolution depth maps. In the stereoscopic depth pipeline 600, a monocular camera was used, and the depth map is scaled from 240 pixels to 480 pixels or 1080 pixels. In embodiments, a 2D image or depth frame may be organized as a count of pixels per line (N), and a count of lines (M), or N×M. For example 640×480 means 640 pixels per line and 480 lines.

At block 602, sequential frame N and frame N−1 are used to scale the resolution of the frames N and N−1 to 480 pixels. At block 604, motion estimation is performed with six degrees of freedom. At block 606, a 4-point warp or other suitable affine transform to reshape the image alignment is performed on frame N−1. At block 608, stereoscopic matching is performed on frame N and frame N−1. At block 602, holes in the depth map may be filled. At block 612, a texture sampler in the GPU may be used to rescale the depth map.

Figure 7:
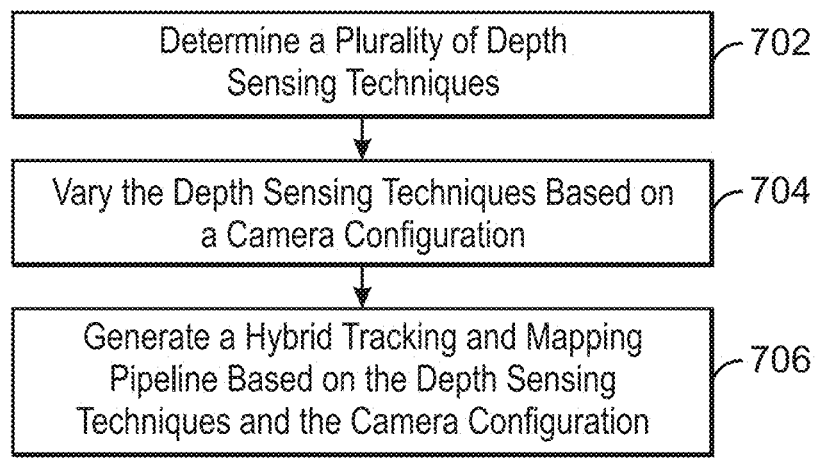
FIG. 7 is a method 700 for generating an HTAM pipeline.

FIG. 7 is a method 700 for HTAM. At block 702, a plurality of depth sensing techniques may be determined. The depth sensing techniques may be, for example, disparity estimation from stereoscopic image left/right pairs, virtual stereoscopic frames, multi-view stereoscopic (MVS) reconstruction from image sequences, and structured light scanning. At block 704, the plurality of depth sensing techniques may be varied based on a camera configuration. For example, a monocular camera configuration may use virtual stereoscopic image left/right pairs when sensing depth. At block 706, a hybrid tracking and mapping (HTAM) pipeline may be generated based on the depth sensing techniques and the camera configuration. In examples, the HTAM pipeline includes several depth sensing techniques that are each used to optimize a depth representation. Additionally, the HTAM pipeline may include variable depth representations, such as a variable resolution depth map.

Figure 8:
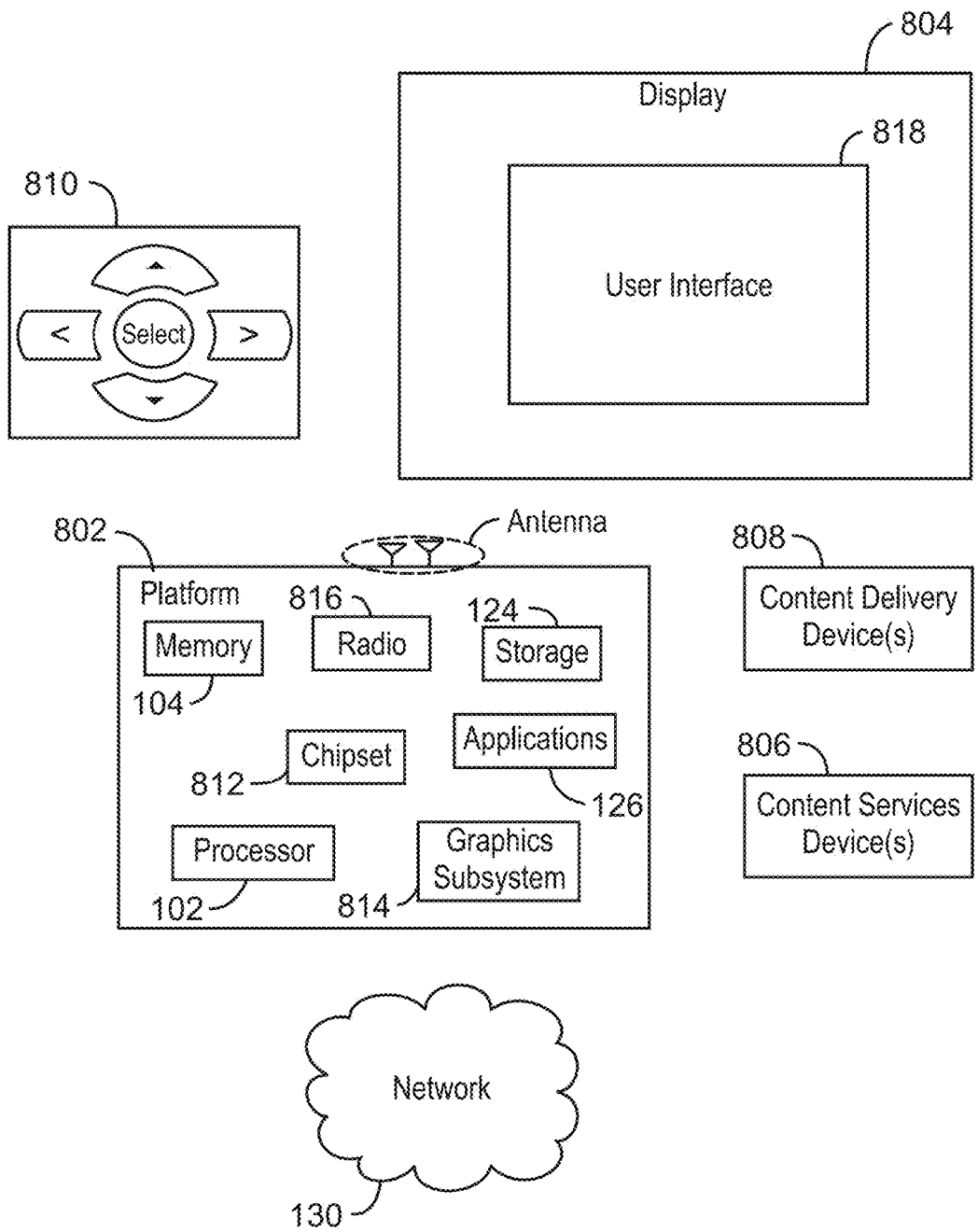
FIG. 8 is a block diagram of an exemplary system for generating an HTAM pipeline.

FIG. 8 is a block diagram of an exemplary system 800 for generating an HTAM pipeline. Like numbered items are as described with respect to FIG. 1. In some embodiments, the system 800 is a media system. In addition, the system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

In various embodiments, the system 800 comprises a platform 802 coupled to a display 804. The platform 802 may receive content from a content device, such as content services device(s) 806 or content delivery device(s) 808, or other similar content sources. A navigation controller 810 including one or more navigation features may be used to interact with, for example, the platform 802 and/or the display 804. Each of these components is described in more detail below.

The platform 802 may include any combination of a chipset 812, a central processing unit (CPU) 102, a memory device 104, a storage device 124, a graphics subsystem 814, applications 126, and a radio 816. The chipset 812 may provide intercommunication among the CPU 102, the memory device 104, the storage device 124, the graphics subsystem 814, the applications 126, and the radio 814. For example, the chipset 812 may include a storage adapter (not shown) capable of providing intercommunication with the storage device 124.

The CPU 102 may be implemented as Complex Instruction Set Computer (CISC) or Reduced Instruction Set Computer (RISC) processors, x86 instruction set compatible processors, multi-core, or any other microprocessor or central processing unit (CPU). In some embodiments, the CPU 102 includes dual-core processor(s), dual-core mobile processor(s), or the like.

The memory device 104 may be implemented as a volatile memory device such as, but not limited to, a Random Access Memory (RAM), Dynamic Random Access Memory (DRAM), or Static RAM (SRAM). The storage device 124 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 124 includes technology to increase the storage performance enhanced protection for valuable digital media when multiple hard drives are included, for example.

The graphics subsystem 814 may perform processing of images such as still or video for display. The graphics subsystem 814 may include a graphics processing unit (GPU), such as the GPU 108, or a visual processing unit (VPU), for example. An analog or digital interface may be used to communicatively couple the graphics subsystem 814 and the display 804. For example, the interface may be any of a High-Definition Multimedia Interface, DisplayPort, wireless HDMI, and/or wireless HD compliant techniques. The graphics subsystem 814 may be integrated into the CPU 102 or the chipset 812. Alternatively, the graphics subsystem 814 may be a stand-alone card communicatively coupled to the chipset 812.

The graphics and/or video processing techniques described herein may be implemented in various hardware architectures. For example, graphics and/or video functionality may be integrated within the chipset 812. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 816 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 816 may operate in accordance with one or more applicable standards in any version.

The display 804 may include any television type monitor or display. For example, the display 804 may include a computer display screen, touch screen display, video monitor, television, or the like. The display 804 may be digital and/or analog. In some embodiments, the display 804 is a holographic display. Also, the display 804 may be a transparent surface that may receive a visual projection. Such projections may convey various forms of information, images, objects, or the like. For example, such projections may be a visual overlay for a mobile augmented reality (MAR) application. Under the control of one or more applications 126, the platform 802 may display a user interface 818 on the display 804.

The content services device(s) 806 may be hosted by any national, international, or independent service and, thus, may be accessible to the platform 802 via the Internet, for example. The content services device(s) 806 may be coupled to the platform 802 and/or to the display 804. The platform 802 and/or the content services device(s) 806 may be coupled to a network 130 to communicate (e.g., send and/or receive) media information to and from the network 130. The content delivery device(s) 808 also may be coupled to the platform 802 and/or to the display 804.

The content services device(s) 806 may include a cable television box, personal computer, network, telephone, or Internet-enabled device capable of delivering digital information. In addition, the content services device(s) 806 may include any other similar devices capable of unidirectionally or bidirectionally communicating content between content providers and the platform 802 or the display 804, via the network 130 or directly. It will be appreciated that the content may be communicated unidirectionally and/or bidirectionally to and from any one of the components in the system 800 and a content provider via the network 130. Examples of content may include any media information including, for example, video, music, medical and gaming information, and so forth.

The content services device(s) 806 may receive content such as cable television programming including media information, digital information, or other content. Examples of content providers may include any cable or satellite television or radio or Internet content providers, among others.

In some embodiments, the platform 802 receives control signals from the navigation controller 810, which includes one or more navigation features. The navigation features of the navigation controller 810 may be used to interact with the user interface 818, for example. The navigation controller 810 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combination thereof. Such physical gestures can be recognized and translated into commands or instructions.

Movements of the navigation features of the navigation controller 810 may be echoed on the display 804 by movements of a pointer, cursor, focus ring, or other visual indicators displayed on the display 804. For example, under the control of the applications 126, the navigation features located on the navigation controller 810 may be mapped to virtual navigation features displayed on the user interface 818. In some embodiments, the navigation controller 810 may not be a separate component but, rather, may be integrated into the platform 802 and/or the display 804.

The system 800 may include drivers (not shown) that include technology to enable users to instantly turn on and off the platform 802 with the touch of a button after initial boot-up, when enabled, for example. Program logic may allow the platform 802 to stream content to media adaptors or other content services device(s) 806 or content delivery device(s) 808 when the platform is turned "off." In addition, the chipset 812 may include hardware and/or software support for 5.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 800 may be integrated. For example, the platform 802 and the content services device(s) 806 may be integrated; the platform 802 and the content delivery device(s) 808 may be integrated; or the platform 802, the content services device(s) 806, and the content delivery device(s) 808 may be integrated. In some embodiments, the platform 802 and the display 804 are an integrated unit. The display 804 and the content service device(s) 806 may be integrated, or the display 804 and the content delivery device(s) 808 may be integrated, for example.

The system 800 may be implemented as a wireless system or a wired system. When implemented as a wireless system, the system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 802 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 8.

Figure 9:
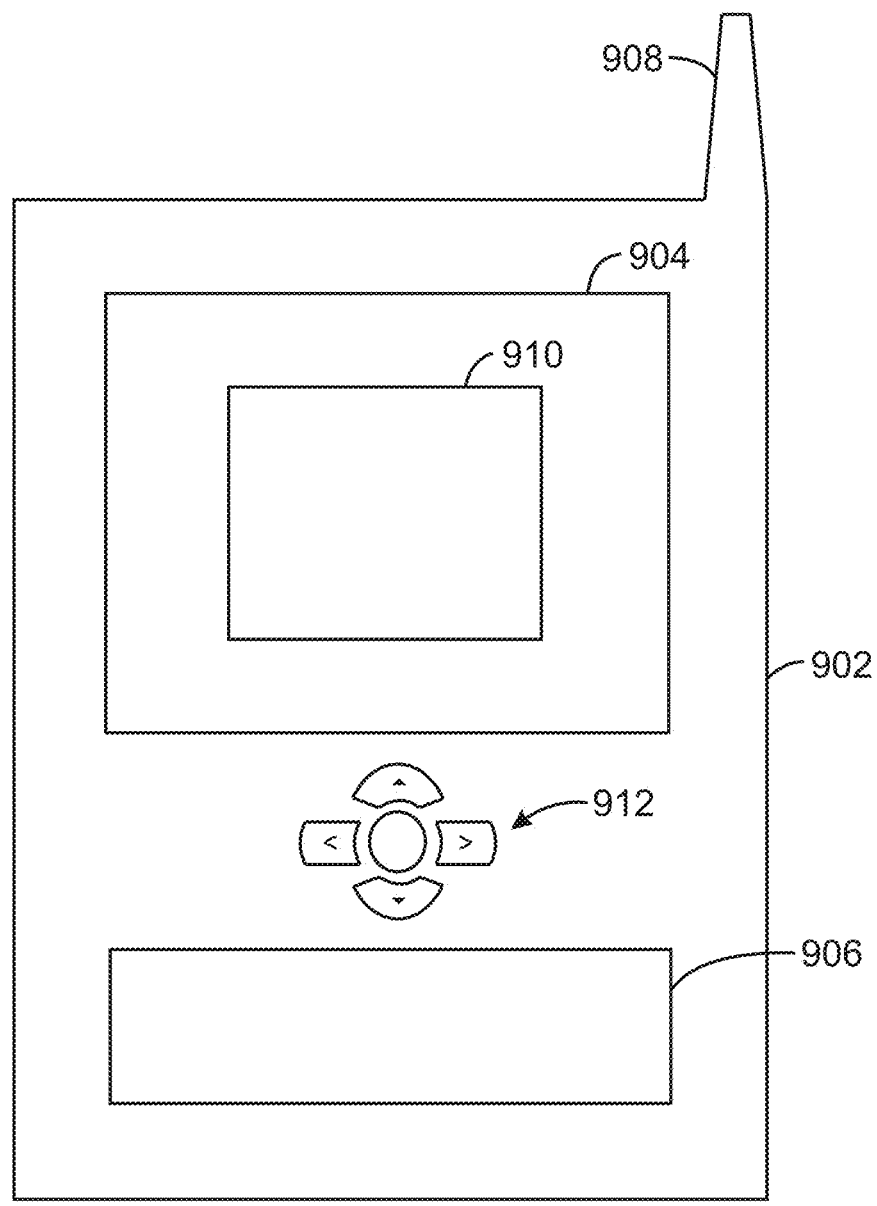
FIG. 9 is a schematic of a small form factor device in which the system of FIG. 8 may be embodied.

FIG. 9 is a schematic of a small form factor device 900 in which the system 800 of FIG. 8 may be embodied. Like numbered items are as described with respect to FIG. 8. In some embodiments, for example, the device 900 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 9, the device 900 may include a housing 902, a display 904, an input/output (I/O) device 906, and an antenna 908. The device 900 may also include navigation features 910. The display 904 may include any suitable display unit for displaying information appropriate for a mobile computing device. The I/O device 906 may include any suitable I/O device for entering information into a mobile computing device. For example, the I/O device 906 may include an alphanumeric keyboard, a numeric keypad, a touch pad, input keys, buttons, switches, rocker switches, microphones, speakers, a voice recognition device and software, or the like. Information may also be entered into the device 900 by way of microphone. Such information may be digitized by a voice recognition device.

In some embodiments, the small form factor device 900 is a tablet device. In some embodiments, the tablet device includes an image capture mechanism, where the image capture mechanism is a camera, stereoscopic camera, infrared sensor, or the like. The image capture device may be used to capture image information, depth information, or any combination thereof. The tablet device may also include one or more sensors. For example, the sensors may be a depth sensor, an image sensor, an infrared sensor, an X-Ray photon counting sensor or any combination thereof. The image sensors may include charge-coupled device (CCD) image sensors, complementary metal-oxide-semiconductor (CMOS) image sensors, system on chip (SOC) image sensors, image sensors with photosensitive thin film transistors, or any combination thereof. In some embodiments, the small form factor device 900 is a camera.

Furthermore, in some embodiments, the present techniques may be used with displays, such as television panels and computer monitors. Any size display can be used. In some embodiments, a display is used to render images and video that include variable resolution depth representations. Moreover, in some embodiments, the display is a three dimensional display. In some embodiments, the display includes an image capture device to capture images using variable resolution depth representations. In some embodiments, an image device may capture images or video using variable resolution depth representations, and then render the images or video to a user in real time.

Additionally, in embodiments, the computing device 100 may include a print engine. The print engine can send an image to a printing device. The image may include a depth representation as described herein. The printing device can include printers, fax machines, and other printing devices that can print the resulting image using a print object module. In some embodiments, the print engine may send a depth representation generated by an HTAM pipeline to the printing device across a network 130 (FIG. 1, FIG. 6). In some embodiments, the printing device includes one or more sensors to vary depth information based on a depth indicator. The printing device may also generate, render, and print the variable resolution depth representation.

Example 1

An apparatus for hybrid tracking and mapping is described herein. The apparatus includes logic to determine a plurality of depth sensing techniques and logic to vary the plurality of depth sensing techniques based on a sensor configuration. The apparatus also includes logic to vary the plurality of depth sensing techniques based on a compute unit configuration and logic to generate a hybrid tracking and mapping pipeline based on the depth sensing techniques, sensor configuration, and the compute unit configuration.

The depth sensing techniques may include disparity estimation from stereoscopic image left/right pairs, virtual stereoscopic frames, multi-view stereoscopic (MVS) reconstruction from image sequences, and structured light scanning. The compute unit configuration may include a location of the unit, the movement of the unit, and the power available to the unit. The pipeline is may be regenerated based on a new compute unit configuration. Additionally, the pipeline may be optimized based on the compute unit configuration. Algorithm tuning may be used to generate the hybrid tracking and mapping pipeline. The hybrid tracking and mapping pipeline may be used to produce a variable resolution depth representation. Further, the apparatus may be a tablet device, print device, or smart phone.

Example 2

An image capture device is described herein. The image capture device includes at least one sensor. The sensor captures depth information that is processed by a hybrid tracking and mapping pipeline, wherein the hybrid tracking and mapping pipeline includes a plurality of depth sensing techniques. The depth sensing techniques may include disparity estimation from stereoscopic image left/right pairs, virtual stereoscopic frames, multi-view stereoscopic (MVS) reconstruction from image sequences, and structured light scanning. The plurality of depth sensing techniques may vary based on a camera configuration. Virtual stereoscopic reconstruction may be performed by rectifying, aligning, and cropping sequential image data. Additionally, neighboring pixels or features can be used to interpolate values within a stereoscopic left/right frame pair. A bundle of past frames, a past point cloud, an image pyramid buffer, or any combination thereof may be used in an MVS reconstruction stage to improve the depth map. Further, the hybrid tracking and mapping pipeline may generate a depth representation.

Example 3

A system for hybrid tracking and mapping is described herein. The system includes a display, a radio, a memory that is to store instructions and that is communicatively coupled to the display, and a processor communicatively coupled to the radio and the memory, wherein when the processor is to execute the instructions. The instructions cause the processor to determine a plurality of depth sensing techniques and vary the plurality of depth sensing techniques based on a camera configuration. The instructions also cause the processor to generate a hybrid tracking and mapping pipeline based on the depth sensing techniques and the camera configuration. The depth sensing techniques may include disparity estimation from stereoscopic image left/right pairs, virtual stereoscopic frames, multi-view stereoscopic (MVS) reconstruction from image sequences, and structured light scanning. The camera configuration may include a sensor type, an amount of power available, and a resolution of an image sensor. Algorithm tuning may be used to generate the hybrid tracking and mapping pipeline. The hybrid tracking and mapping pipeline may be used to produce a variable resolution depth representation.

Example 4

A method for hybrid tracking and mapping is described herein. The method includes determining a plurality of depth sensing techniques and varying the plurality of depth sensing techniques based on a camera configuration, wherein the camera configuration is a monocular camera that produces a sequence of frames. The method also includes generating a hybrid tracking and mapping pipeline based on the depth sensing techniques and the camera configuration. A virtual stereo pair of frames may be generated using a frame N and a frame N−1 of the sequence of frames by locating fiducial marks in the sequence of frames, determining the orientation of a camera pose, and performing an affine transform on the frame N and the frame N−1. Additionally, the virtual stereo pair of frames may be used to generate depth information.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus for hybrid tracking and mapping, comprising:

logic to determine a plurality of depth sensing techniques;

logic to vary the plurality of depth sensing techniques based on a sensor configuration, wherein in response to a plurality of sensors the depth sensing techniques comprise at least stereoscopic imaging, otherwise the depth sensing techniques comprise at least virtual stereoscopic reconstruction;

logic to vary the plurality of depth sensing techniques based on a compute unit configuration, wherein in response to an accelerometer in the compute unit configuration the accelerometer is to guide a depth algorithm selection; and logic to generate a hybrid tracking and mapping pipeline to produce a variable resolution depth representation based on the depth sensing techniques, sensor configuration, and the compute unit configuration.

2. The apparatus of claim 1, wherein the depth sensing techniques include disparity estimation from stereoscopic image left/right pairs, virtual stereoscopic frames, multi-view stereoscopic (MVS) reconstruction from image sequences, and structured light scanning.

3. The apparatus of claim 1, wherein the compute unit configuration includes a location of the compute unit, a movement of the compute unit, and a power available to the compute unit.

4. The apparatus of claim 1, wherein the pipeline is regenerated based on a new compute unit configuration.

5. The apparatus of claim 1, wherein the pipeline is optimized based on the compute unit configuration.

6. The apparatus of claim 1, wherein algorithm tuning is used to generate the hybrid tracking and mapping pipeline.

7. The apparatus of claim 1, wherein the apparatus is a tablet device, print device, or smart phone.

* * * * *